(12) United States Patent
Fujisawa et al.

(10) Patent No.: US 10,007,037 B2
(45) Date of Patent: Jun. 26, 2018

(54) INFRARED-RAY REFLECTIVE FILM

(71) Applicant: NITTO DENKO CORPORATION, Osaka (JP)

(72) Inventors: Junichi Fujisawa, Fukui (JP); Yutaka Ohmori, Toyohashi (JP); Masahiko Watanabe, Toyohashi (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 0 days. days.

(21) Appl. No.: 14/784,211

(22) PCT Filed: Mar. 19, 2014

(86) PCT No.: PCT/JP2014/057516
§ 371 (c)(1),
(2) Date: Oct. 13, 2015

(87) PCT Pub. No.: WO2014/167964
PCT Pub. Date: Oct. 16, 2014

(65) Prior Publication Data
US 2016/0047958 A1    Feb. 18, 2016

(30) Foreign Application Priority Data

Apr. 11, 2013    (JP) ................. 2013-083371

(51) Int. Cl.
*F21V 9/04*    (2018.01)
*F21V 9/06*    (2018.01)
(Continued)

(52) U.S. Cl.
CPC ............... *G02B 5/208* (2013.01); *B32B 9/00* (2013.01); *B32B 15/04* (2013.01); *G02B 5/0875* (2013.01);
(Continued)

(58) Field of Classification Search
CPC .. B32B 15/04; B32B 9/00; B32B 7/06; B32B 27/08; B32B 17/1022; B32B 17/10229;
(Continued)

(56) References Cited

U.S. PATENT DOCUMENTS

| 4,610,771 A | 9/1986 | Gillery |
| 4,622,120 A | 11/1986 | Gillery |

(Continued)

FOREIGN PATENT DOCUMENTS

| CN | 102667545 A | 9/2012 |
| EP | 2347895 A1 | 7/2011 |

(Continued)

OTHER PUBLICATIONS

Chinese Office Action for application No. 201410146172.X dated Sep. 16, 2015.

(Continued)

*Primary Examiner* — Mustak Choudhury
(74) *Attorney, Agent, or Firm* — Hauptman Ham, LLP (57) ABSTRACT

An infrared-ray reflective film (100) of the present invention is configured by disposing an infrared reflective layer (20) and a transparent protective layer (30) on a transparent film backing (10) in this order. The infrared reflective layer (20) comprises: a first metal oxide layer (21); a metal layer (25) made of a silver alloy containing silver in an amount of 96 to 99.9 weight %; and a second metal oxide layer (22), which are arranged in this order from the side of the transparent film backing (10), wherein each of the first metal oxide layer (21) and the second metal oxide layer (22) is in direct contact with the metal layer (25). There is no metal layer between the transparent film backing (10) and the infrared reflective layer (20) and between the infrared reflective layer (20) and the transparent protective layer (30). Preferably, the infrared-ray reflective film of the present (Continued)

invention has a visible ray transmittance of 65% or more, a shading coefficient of less than 0.60, and a corrected emissivity as measured from the side of the transparent protective layer of 0.20 or less.

15 Claims, 1 Drawing Sheet

(51) Int. Cl.
    *G02B 5/08*     (2006.01)
    *G02B 5/20*     (2006.01)
    *B32B 9/00*     (2006.01)
    *B32B 15/04*     (2006.01)
    *G02B 5/26*     (2006.01)

(52) U.S. Cl.
    CPC .......... *G02B 5/26* (2013.01); *B32B 2307/412* (2013.01); *B32B 2605/006* (2013.01)

(58) Field of Classification Search
    CPC ........ B32B 17/10174; B32B 2255/205; B32B 2605/006; G02B 5/0875; G02B 5/208; G02B 5/0808; G02B 5/206; G02B 5/26; G02B 5/0841; G02B 5/281; G02B 5/287; G02B 5/3033; G02B 5/305; G02B 5/0858; G02B 5/0866; G02B 1/111; G02B 1/105; G02B 2027/0118; G02B 2027/012; G02B 2027/014; G02B 23/12; G02B 27/01; G02B 27/0101; C03C 17/007; C03C 2217/445; C03C 2217/479; C03C 2218/11; C03C 17/34; C03C 17/36; C03C 17/3644; C03C 17/366; C03C 17/3681; C03C 17/38; C03C 17/42; C03C 17/3417; C03C 17/3618; C03C 17/3639; C03C 17/3652; C03C 17/3613; C03C 2217/78; C03C 14/08; C03C 14/3414; C03C 14/5806; Y10T 428/265; Y10T 428/31678; Y10T 428/24942; Y10T 428/12549; Y10T 428/2848; Y10T 29/49826; Y10S 428/913; E06B 3/6715
    USPC ....... 359/350, 352, 355, 356, 359–361, 585; 427/109, 162; 428/212, 213, 215, 328, 428/432, 469, 472, 701, 702; 252/182.33, 252/582, 587
    See application file for complete search history.

(56) References Cited

U.S. PATENT DOCUMENTS

| | | | |
|---|---|---|---|
| 4,716,086 A | | 12/1987 | Gillery |
| 4,786,563 A | | 11/1988 | Gillery et al. |
| 4,948,677 A | | 8/1990 | Gillery |
| 5,071,206 A | * | 12/1991 | Hood ...................... B32B 17/10 204/192.27 |
| 5,306,547 A | * | 4/1994 | Hood ................ B32B 17/10174 359/360 |
| 5,956,175 A | | 9/1999 | Hojnowski |
| 6,030,671 A | | 2/2000 | Yang et al. |
| 2003/0012963 A1 | | 1/2003 | Ebisawa et al. |
| 2003/0186062 A1 | | 10/2003 | Ebisawa et al. |
| 2006/0057399 A1 | | 3/2006 | Persoone et al. |
| 2008/0280147 A1 | | 11/2008 | Thiel |
| 2009/0011205 A1 | | 1/2009 | Thiel |
| 2011/0212336 A1 | * | 9/2011 | Kawamoto .......... H05K 9/0096 428/469 |
| 2011/0308693 A1 | * | 12/2011 | Van Nutt ............ B32B 17/1022 156/60 |
| 2012/0052320 A1 | | 3/2012 | Van Nutt et al. |
| 2012/0127578 A1 | | 5/2012 | Bright et al. |
| 2012/0268810 A1 | | 10/2012 | Ohmori et al. |
| 2013/0105069 A1 | | 5/2013 | Van Nutt et al. |
| 2013/0342899 A1 | | 12/2013 | Van Nutt et al. |
| 2014/0065439 A1 | | 3/2014 | Van Nutt et al. |
| 2014/0072786 A1 | | 3/2014 | Van Nutt et al. |
| 2014/0098414 A1 | | 4/2014 | Ohmori et al. |
| 2014/0101919 A1 | | 4/2014 | Van Nutt et al. |
| 2015/0301244 A1 | | 10/2015 | Van Nutt et al. |

FOREIGN PATENT DOCUMENTS

| | | |
|---|---|---|
| JP | 60-59147 B2 | 12/1985 |
| JP | 6-62319 B2 | 8/1994 |
| JP | 8-208280 A | 8/1996 |
| JP | 10-286900 A | 10/1998 |
| JP | 2000117871 A | 4/2000 |
| JP | 2000229381 A | 8/2000 |
| JP | 2003104758 A | 4/2003 |
| JP | 2006505811 A | 2/2006 |
| JP | 2006334787 A | 12/2006 |
| JP | 2007076347 A | 3/2007 |
| JP | 2007165593 A | 6/2007 |
| JP | 2007214301 A | 8/2007 |
| JP | 2007250430 A | 9/2007 |
| JP | 2009226918 A | 10/2009 |
| JP | 2010536707 A | 12/2010 |
| JP | 2011037255 A | 2/2011 |
| JP | 2012-135888 A | 7/2012 |
| JP | 2013-010341 A | 1/2013 |
| KR | 100791211 B1 | 1/2008 |
| WO | 2011017039 A2 | 2/2011 |
| WO | 2011109306 A2 | 9/2011 |
| WO | 2012120725 A1 | 9/2012 |

OTHER PUBLICATIONS

International Search Report for PCT/JP2014/057516 dated Jun. 3, 2014.
Korean Notice of Allowance for application No. 10-2015-7031953, dated Jan. 12, 2016.
Japanese Office Action dated Aug. 8, 2016 for Japanese Application No. 2015-244920.
Presentation of Information dated Aug. 1, 2016 for Japanese Application No. 2015-244920.
Presentation of Information dated Feb. 14, 2017 for Japanese Patent Application No. JP 2015-244920.
Decision to Grant a Patent dated May 18, 2017 for Japanese Patent Application No. JP 2015-244920.
Japanese Industrial Standard, "JIS R 3107, Evaluation on thermal resistance of flat glasses and thermal transmittance of glazing", Mar. 20, 1998, Japanese Standards Association, Japan.
European Office Action dated Feb. 26, 2018 for corresponding European Application No. 14782187.0, citing the above references.

* cited by examiner

INFRARED-RAY REFLECTIVE FILM

TECHNICAL FIELD

The present invention relates to an infrared-ray reflective film which is used, mainly, in a state of being disposed on an indoor side of a window glass. In particular, the present invention relates to an infrared-ray reflective film capable of achieving a good balance between heat shielding property and heat insulating property and exhibiting both excellent visible ray transmissibility and durability in actual use environments.

BACKGROUND ART

Theretofore, there has been known an infrared-ray reflective substrate configured by disposing an infrared reflective layer on a backing such as glass or film. As the infrared reflective layer, a laminate obtained by alternately laminating a metal layer and a metal oxide layer is widely used. It functions to reflect near-infrared rays such as solar light to thereby impart heat insulating property. As the metal layer, silver or the like is widely used, from a viewpoint of enhancing a selective reflectivity in the infrared region. As the metal oxide layer, indium-tin composite oxide (ITO) or the like is widely used. Generally, in an infrared-ray reflective film using a film backing, with a view to protecting a infrared reflective layer thereof, a protective layer is provided on the infrared reflective layer on a side opposite to the backing.

A key point for reduction in emissivity of the infrared-ray reflective film is to effectively reflect far-infrared rays toward an indoor space by a metal layer comprised in the infrared reflective layer. However, an organic material used as the protective layer for the infrared reflective layer generally contains a C=C bond, a C=O bond, a C=O bond and an aromatic ring, and therefore exhibits large infrared vibrational absorption in a wavelength range of 5 μm to 25 μm within a far-infrared region. Far-infrared rays absorbed by the protective layer are thermally diffused toward an outdoor space by heat conduction, without being reflected by the metal layer. Thus, when an amount of far-infrared rays absorbed by the protective layer becomes larger, the emissivity of the infrared-ray reflective film increases, resulting in failing to obtain a heat insulating effect. As above, in the infrared-ray reflective film, there is a trade-off relationship between emissivity reduction and the durability enhancement.

As means to reduce the emissivity of the infrared-ray reflective film, the following Patent Document 1 proposes a technique of reducing a thickness of the protective layer to reduce an amount of far-infrared rays to be absorbed by the protective layer. However, the reduction in thickness of the protective layer tends to cause deterioration in its protective effect for the infrared reflective layer and thus deterioration in durability of the infrared reflective layer, particularly, the metal layer. Generally, degradation of the metal layer is liable to cause deterioration in heat insulating property due to a rise in far-infrared absorptance, and decrease in visible ray transmittance, in the infrared-ray reflective substrate. In view of this problem, in the Patent Document 1, with respect to a first metal layer such as a silver layer, comprised in an infrared reflective layer, a highly-durable, second metal layer such as a Ni—Cr alloy is additionally disposed in adjacent relation, to thereby impart durability to the first metal layer.

CITATION LIST

Patent Document

Patent Document 1: Pamphlet of WO 2011/109306A

SUMMARY OF INVENTION

Technical Problem

The use of a protective layer having a low far-infrared absorption capacity and the addition of a second metal layer such as a Ni—Cr alloy, as in the Patent Document 1, makes it possible to obtain an infrared-ray reflective film having durability, as well as heat shielding property based on reflection of near-infrared rays and heat insulating property based on reflection of far-infrared rays. However, the Ni—Cr alloy layer having a low visible ray transmittance causes a problem that a visible ray transmittance of the infrared-ray reflective film is reduced to about 50%.

As means to enhance heat shielding property while suppressing decrease in visible ray transmittance, it is conceivable that the infrared reflective layer is formed as a sub-laminate having, for example, a 5-layer structure composed of a metal oxide layer/a metal layer/a metal oxide layer/a metal layer/a metal oxide layer, to thereby enhance wavelength selectivity in reflectance. As the number of layers in the sub-laminate is increased stepwise from 5 to 7, 9, - - - , the wavelength selectivity in reflectance is more enhanced, so that it becomes possible to increase a near-infrared reflectance to impart heat shielding property, while enhancing visible ray transmittance. However, the increase in the number of layers in the laminated infrared reflective layer gives rise to a problem of deterioration in productivity and increase in cost. Moreover, the technique of increasing the number of layers in the sub-laminate can provide enhanced heat shielding property but has difficulty in solving the problem of deterioration in durability.

As above, heat insulating property, visible ray transmissibility and durability have a trade-off relationship therebetween. Therefore, any infrared-ray reflective film meeting all of the above required properties and having excellent productivity has not been yet obtained.

Solution to Technical Problem

As a result of studies, the inventors found that, by employing a given laminate structure, an infrared-ray reflective film capable of achieving a good balance between heat shielding property and heat insulating property and exhibiting both visible ray transmissibility and durability can be obtained, even using a single metal layer, and have reached the present invention.

The present invention provides an infrared-ray reflective film configured by disposing: an infrared reflective layer comprising a first metal oxide layer, a metal layer, and a second metal oxide layer; and a transparent protective layer made of an organic material, on a transparent film backing in this order. There is no metal layer between the transparent film backing and the first metal oxide layer and between the second metal oxide layer and the transparent protective layer. In the infrared reflective layer, each of the first metal oxide layer and the second metal oxide layer is in direct contact with the metal layer. Preferably, the metal layer is made of a silver alloy containing silver in an amount of 96 to 99.9 weight %. More preferably, the metal layer contains 0.1 weight % or more of palladium.

In the infrared-ray reflective film of the present invention, a visible ray transmittance and a shading coefficient are preferably set to 65% or more and less than 0.60, respectively. Further, a corrected emissivity as measured from the side of the transparent protective layer is preferable set to 0.20 or less.

Preferably, in the infrared-ray reflective film of the present invention, each of the first metal oxide layer and the second metal oxide layer is a zinc oxide-containing, amorphous, composite metal oxide layer made, for example, of indium-zinc composite oxide, tin-zinc composite oxide, and indium-tin-zinc composite oxide. Further, the transparent protective layer is preferably formed by wet coating.

Preferably, in the infrared-ray reflective film of the present invention, a change in emissivity of the infrared-ray reflective film after being immersed in a 5 weight % sodium chloride aqueous solution at 50° C., for 5 days, is 0.05 or less.

Effect of Invention

The infrared-ray reflective film of the present invention is capable of achieving a good balance between heat shielding property and heat insulating property, so that it can bring out energy-saving effect through a whole year. The infrared-ray reflective film of the present invention is also capable of exhibiting both visible ray transmissibility and durability, so that it can be suitably used as a heat shielding and heat insulating film for a window glass of a building or an automobile.

DESCRIPTION OF EMBODIMENTS

Figure 1:
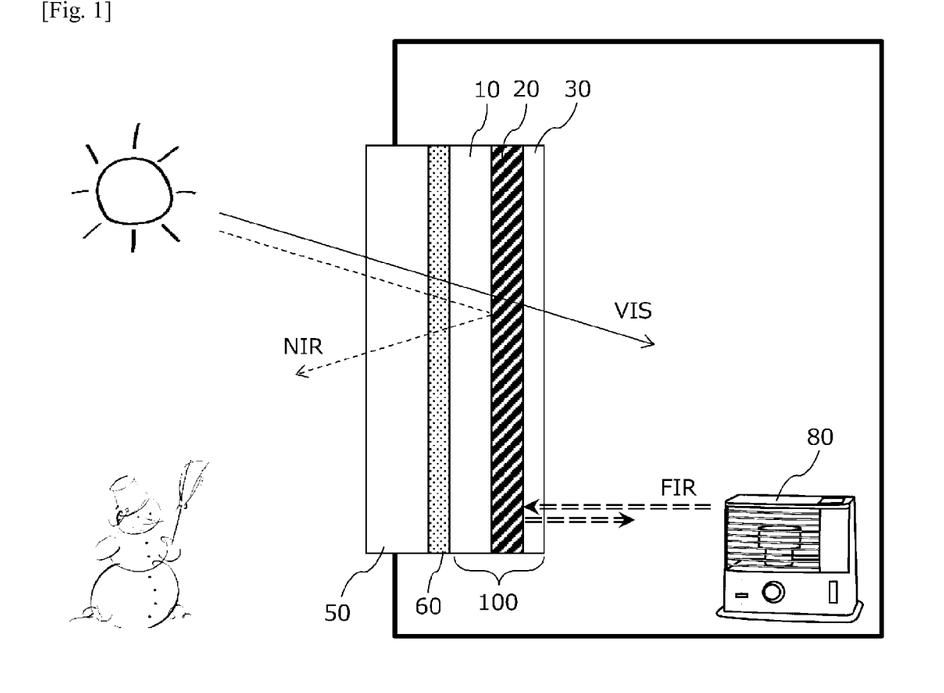
FIG. 1 is a sectional view schematically illustrating an example of how an infrared-ray reflective film is used.

An infrared-ray reflective film according to the present invention will now be described by appropriately referring to the drawings. FIG. 1 is a sectional view schematically illustrating a usage mode of an infrared-ray reflective film. An infrared-ray reflective film 100 according to the present invention is configured by disposing an infrared reflective layer 20 and a transparent protective layer 30 on a transparent film backing 10. The infrared-ray reflective film 100 is bonded to a window 50 of a building or an automobile through an appropriate adhesive layer 60 or the like in a posture where a surface of the transparent film backing 10 faces the window 50, and disposed on an indoor side of the window 50. In this use mode, the transparent protective layer 30 is disposed on the indoor side.

As schematically illustrated in FIG. 1, the infrared-ray reflective film 100 according to the present invention is capable of transmitting visible rays (VIS) from an outdoor space to introduce it into an indoor space, while reflecting near-infrared rays (NIR) from the outdoor space by the infrared reflective layer 20. Based on the reflection of near-infrared rays, it is possible to suppress inflow of heat caused by solar light and others, from the outdoor space into the indoor space (bring out a heat shielding effect), and thus enhance cooling efficiency in summer. In addition, the infrared reflective layer 20 is capable of reflecting indoor far-infrared rays (FIR) emitted from a heating device 80 or the like, so that it is possible to bring out a heat insulating effect, and thus enhance heating efficiency in winter.

[Infrared-Ray Reflective Film]

Figure 2:
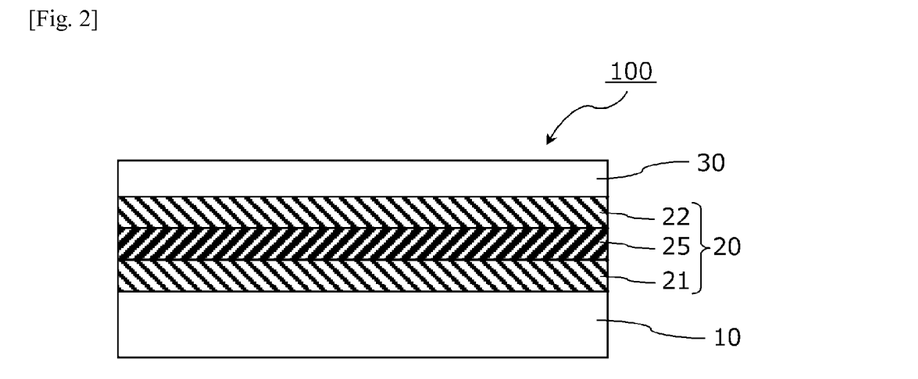
FIG. 2 is a sectional view schematically illustrating a sub-laminate structure of an infrared-ray reflective film according to one embodiment of the present invention.

As illustrated in FIG. 2, the infrared-ray reflective film 100 is configured by disposing the infrared reflective layer 20 and the transparent protective layer 30 on one principal surface of the transparent film backing 10, in this order. In the infrared-ray reflective film 100, there is no metal layer between the transparent film backing 10 and the infrared reflective layer 20 and between the infrared reflective layer 20 and the transparent protective layer 30. The infrared reflective layer 20 comprises a first metal oxide layer 21, a metal layer 25, and a second metal oxide layer 22, which are arranged in this order from the side of the transparent film backing 10, wherein each of the first metal oxide layer 21 and the second metal oxide layer 22 is in direct contact with the metal layer 25.

For reflecting indoor far-infrared rays by the infrared reflective layer 20, it is important that an amount of far-infrared rays to be absorbed by the transparent protective layer 30 is sufficiently small. On the other hand, the transparent protective layer 30 requires mechanical strength and chemical strength for preventing abrasion and degradation of the infrared reflective layer 20. The infrared-ray reflective film according to the present invention is configured to have a given laminate structure so as to exhibit all of transparency (visible ray transmissibility), heat shielding property based on reflection of near-infrared rays, heat insulating property based on reflection of far-infrared rays, and durability. The layers making up the infrared-ray reflective film will be described one-by-one below.

[Transparent Film Backing]

As the transparent film backing 10, a flexible resin film having a visible ray transmittance of 80% or more can be suitably used. In this specification, the visible ray transmittance is measured according to JIS A5759-2008 (films for building glazings).

For example, a thickness of the transparent film backing 10 is set to, but not particularly limited to, the range of about 10 to 300 μm. In some cases, a process of forming the infrared reflective layer 20 on the transparent film backing 10 is performed at high temperatures. Thus, the resin material for the transparent film backing is preferably a type having excellent heat resistance. Examples of the transparent film backing include polyethylene terephthalate (PET), polyethylene naphthalate (PEN), polyether ether ketone (PEEK), and polycarbonate (PC).

With a view to enhancing mechanical strength of the infrared-ray reflective film, etc., a hard coat layer or the like may be provided on a surface of the transparent film backing 10. With a view to enhancing adhesion with respect to the adhesive layer 60 provided on the surface of the transparent film backing 10 and with respect to the infrared reflective layer 20, or another purpose, a surface modification treatment, such as corona treatment, plasma treatment, flame treatment, ozone treatment, primer treatment, glow treatment, saponification treatment, or treatment using a coupling agent may be performed.

[Infrared Reflective Layer]

The infrared reflective layer 20 is capable of transmitting visible rays and reflecting near-infrared rays and far-infrared rays, and comprises a first metal oxide layer 21, a metal layer 25, and a second metal oxide layer 22, which are arranged in this order from the side of the transparent film backing 10.

Further, each of the first metal oxide layer 21 and the second metal oxide layer 22 is in direct contact with the metal layer 25. That is, the infrared reflective layer 20 is composed of these three layers.

<Metal Layer>

The metal layer 25 has a key roll in reflection of infrared rays. In the present invention, as the metal layer interposed between the two metal oxide layers, a silver alloy layer composed mainly of silver can be suitably used, from a viewpoint of increasing the visible ray transmittance and the near-infrared reflectance. Silver has a high free electron density, so that it can realize a high reflectance to near-infrared and far-infrared rays, and provide an infrared-ray reflective film excellent in heat insulating effect and heat shielding effect, even in a situation where the infrared reflective layer 20 is made up of a small number of layers.

Preferably, the metal layer 25 contains silver in an amount of 96 to 99.9 weight %. By setting the content of silver to 96% or more, it is possible to enhance wavelength selectivity in transmittance and reflectance, and thus increase the visible ray transmittance. From a viewpoint of increasing the visible ray transmittance of the infrared-ray reflective film, the content of silver is preferably 97 weight % or more, more preferably, 98 weight % or more, further more preferably, 98 weight % or more, particularly preferably, 99 weight % or more. Along with an increase in the content of silver in the metal layer 25, the visible ray transmittance of the infrared-ray reflective film tends to be increased.

On the other hand, in a situation where silver is exposed to an environment containing water, oxygen, chlorine or the like, or is irradiated with ultraviolet rays or visible rays, it can undergo degradation such as oxidation or corrosion. For this reason, with a view to enhancing durability of the metal layer 25, the metal layer 25 is preferably a silver alloy layer containing a metal other than silver (non-silver metal). From a viewpoint of enhancing the durability, the amount of silver contained in the metal layer 25 is preferably 99.9 weight % or less, more preferably, 99.8 weight % or less, further more preferably, 99.7 weight % or less.

From the viewpoint of enhancing the durability, the metal layer 25 contains a non-silver metal preferably in an amount of 0.1 weight % or more, more preferably, in an amount of 0.2 weight % or more, further more preferably, in an amount of 0.3 weight % or more. Preferable examples of the non-silver metal to be added to the metal layer for enhancing its durability include palladium (Pd), gold (Au), copper (Cu), bismuth (Bi), germanium (Ge) and gallium (Ga). Among them, Pd is most suitably used, from a viewpoint of imparting high durability to silver. When an amount of addition of the non-silver metal such as Pd is increased, the durability of the metal layer tends to be enhanced. On the other hand, if the amount of addition of the non-silver metal such as Pd is excessively increased, the visible ray transmittance of the infrared-ray reflective film tends to decrease. Therefore, the amount of the non-silver metal contained in the metal layer 25 is preferably 4 weight % or less, more preferably, 3 weight % or less, further more preferably, 2 weight % or less, particularly preferably, 1 weight % or less.

<Metal Oxide Layers>

Each of the metal oxide layers 21, 22 is provided with a view to controlling an amount of reflection of visible rays at an interface with the metal layer 25 to thereby achieve a balance between higher visible ray transmittance and higher infrared reflectance, etc. The metal oxide layers also function as protective layers for preventing degradation of the metal layer 25. From a viewpoint of enhancing wavelength selectivity of the infrared reflective layer in reflection and transmission, a refractive index of each of the metal oxide layers 21, 22 with respect to visible rays is preferably 1.5 or more, more preferably, 1.6 or more, further more preferably, 1.7 or more.

Examples of a material having the above refractive index include an oxide of at least one metal selected from the group consisting of Ti, Zr, Hf, Nb, Zn, Al, Ga, In, Tl and Sn, or a composite oxide of two or more of them. Particularly, in the present invention, as each of the first metal oxide layer 21 and the second metal oxide layer 22, a composite metal oxide containing zinc oxide can be suitably used. Further, each of the metal oxide layers is preferably an amorphous phase. When the metal oxide layer is an amorphous layer having zinc oxide, durability of the metal oxide layer itself is enhanced, and an action as a protective layer on the metal layer is enhanced, so that it becomes possible to suppress deterioration in the metal layer 25 made of a silver alloy.

An amount of zinc oxide contained in each of the metal oxide layers 21, 22 is preferably 3 weight pars or more, more preferably, 5 weight parts or more, further more preferably, 7 weight parts or more, with respect to 100 weight parts as a total amount of metal oxides. As long as the content of zinc oxide is in the above range, the metal oxide layers are more likely to become an amorphous layer, so that the durability tends to be enhanced. On the other hand, if the content of zinc oxide is excessively large, the durability conversely tends to deteriorate, and the visible ray transmittance tends to decrease. Therefore, the amount of zinc oxide contained in each of the metal oxide layers 21, 22 is preferably 60 weight pars or less, more preferably, 50 weight parts or less, further more preferably, 40 weight parts or less, with respect to 100 weight parts as the total amount of metal oxides.

Preferable examples of the zinc oxide-containing composite metal oxide include indium-zinc composite oxide (IZO), zinc-tin composite oxide (ZTO), and indium-tin-zinc composite oxide (ITZO), from a viewpoint of satisfying all of the visible ray transmittance, the refractive index, and the durability. Each of the above composite oxides may further contain any other suitable metal such as Al or Ga, and oxide of the metal.

Respective thicknesses of the metal layer 25 and the metal oxide layers 21, 22 are appropriately set to allow the infrared reflective layer to transmit visible rays while selectively reflecting near-infrared rays, considering refractive indexes of respective materials thereof. Specifically, the thickness of the metal layer 25 may be adjusted, for example, within the range of 5 to 50 nm, preferably, 5 to 25 nm, more preferably, 10 to 18 nm. The thickness of each of the metal oxide layers 21, 22 may be adjusted, for example, within the range of 3 to 80 nm, preferably, 3 to 50 nm, more preferably, 3 to 35 nm. Each of the metal layer and the metal oxide layers is preferably formed by, but not particularly limited to, a dry process, such as a sputtering process, a vacuum vapor deposition process, a CVD process or an electron-beam deposition process.

[Transparent Protective Layer]

With a view to preventing abrasion and degradation of the metal oxide layers 21, 22 and the metal layer 25, the transparent protective layer 30 is provided on the second metal oxide layer 22 of the infrared reflective layer 20. From a viewpoint of forming the transparent protective layer within an upper temperature limit (heat-resistant temperature) of the film backing, an organic material is used as a material for the transparent protective layer. It should be noted that the transparent protective layer may be composed mainly of an organic material, and inorganic filler and others may be added thereto.

Preferably, the transparent protective layer 30 is sufficiently low in terms of far-infrared absorptance, in addition to having a high visible ray transmittance. If the far-infrared absorptance is large, indoor far-infrared rays are absorbed by the transparent protective layer 30 and the resulting heat is released to an outdoor space by heat conduction, so that the heat insulating property of the infrared-ray reflective film tends to deteriorate. On the other hand, when the transparent protective layer 30 is sufficiently low in terms of far-infrared absorptance, the far-infrared rays are reflected toward an indoor space by the metal layer 25 of the infrared reflective layer 20, so that the heat insulating effect of the infrared-ray reflective film is enhanced. Examples of means to reduce a far-infrared absorption capacity of the transparent protective layer 30 include a technique of reducing a thickness of the transparent protective layer, and a technique of forming the transparent protective layer using a material having a low far-infrared absorptance.

In the case where the thickness of the transparent protective layer is adjusted to reduce the far-infrared absorption capacity thereof, the thickness of the transparent protective layer is preferably set to 300 nm or less, more preferably, 200 nm or less, further more preferably, 100 nm or less. When the thickness of the transparent protective layer is reduced, the far-infrared absorption capacity becomes smaller to thereby enhance the heat insulating effect, whereas a function as a protective layer to enhance the durability of the transparent protective layer is likely to deteriorate. Therefore, when the thickness of the transparent protective layer is set to 200 nm or less, it is preferable to form the transparent protective layer using a material having excellent strength, and enhance the durability of the infrared reflective layer itself. Examples of means to enhance the durability of the infrared reflective layer itself include a technique of reducing the content of silver while increasing the content of the non-silver metal such as palladium, in the metal layer 25. For example, in the case where the metal layer 25 is made of a silver-palladium alloy, a content ratio by weight of silver to palladium is preferably adjusted to about 96:4 to 98:2.

On the other hand, in the case where the transparent protective layer is formed using a material having a low far-infrared absorptance, the far-infrared absorption capacity can be kept low even when the thickness of the transparent protective layer is increased so as to enhance its protective effect on the infrared reflective layer. In this case, the durability of the infrared-ray reflective film can be enhanced without excessively increasing the content of the non-silver metal such as palladium in the metal layer 25. This is advantageous in enhancing both of the visible ray transmittance and the durability. As a material for the transparent protective layer, a compound containing a C=C bond, a C=O bond, a C=O bond and an aromatic ring in a small amount is suitably used from a viewpoint of reducing the far-infrared absorption capacity. Examples of a material suitably usable to compose the transparent protective layer include: polyolefin such as polyethylene or polypropylene; alicyclic polymer cycloolefin-based polymer; and rubber-based polymer.

The material suitably usable to compose the transparent protective layer is a type having a small far-infrared absorptance, a high visible ray transmittance, excellent adhesion with respect to the infrared reflective layer, and excellent abrasion resistance. From this viewpoint, it is particularly preferable to use rubber-based materials. Among them, a nitrile rubber-based material is suitably used. The nitrile rubber-based material has a structure represented by the following formulas (A), (B) and (C).

In the formulas (A) to (C), R1 is hydrogen or a methyl group, and each of R2 to R5 is, independently, hydrogen, a straight or branched alkyl group having a carbon number of 1 to 4, or a straight or branched alkenyl group having a carbon number of 1 to 4. Particularly, a nitrile rubber in which all of R1 to R5 in the formulas (A) to (C) are hydrogen is excellent in transparency and durability and is therefore suitable as a material for the transparent protective layer.

For example, the nitrile rubber is obtained by copolymerizing acrylonitrile and/or derivatives thereof, and 1,3-butadiene. As the material for the transparent protective layer, a hydrogenated nitrile rubber (HNBR) in which a part or an entirety of double bonds contained in a nitrile rubber is hydrogenated is particularly suitably used. As a result of hydrogenaration of the double bonds, the far-infrared absorptance decreases and thereby the far-infrared absorption capacity of the transparent protective layer decreases, so that it becomes possible to enhance the heat insulating property of the infrared-ray reflective film.

In the case where the hydrogenated nitrile rubber is used as the material for the transparent protective layer, a content ratio by mole of the structural units represented, respectively, by the formulas (A), (B) and (C) (k:l:m) is preferably 3 to 30:20 to 95:0 to 60 (where a sum of k, l and m is 100). The ratio (mole ratio) of k:l:m is more preferably 5 to 25:60 to 90:0 to 20, further more preferably, 15 to 25:65 to 85:0 to 10. By adjusting the ratio of k:l:m to the above range, it becomes possible to form a transparent protective layer having an excellent visible ray transmittance, a small far-infrared absorption capacity, and excellent hardness and adhesion.

In the case where the hydrogenated nitrile rubber is used as the material for the transparent protective layer, from a viewpoint of enhancing the abrasion resistance of the infrared-ray reflective film and ensuring a protective function with respect to the infrared reflective layer, the transparent protective layer 30 preferably has an indentation hardness of 1.2 MPa or more, more preferably, 1.5 MPa or more, further more preferably, 2 MPa or more. For example, a cross-linked structure may be introduced into the polymer to thereby set the indentation hardness to the above range. The introduction of the cross-linked structure allows the transparent protective layer to be enhanced in terms of mechanical strength such as indentation hardness, and solvent resistance. The indentation hardness of the transparent protective layer is measured according to an indentation test using a micro hardness tester. In an indentation measurement, an indenter is pressed into the transparent protective layer by a given indentation depth, and, in this state, an indentation load P on the indenter and a projected area (projected contact area) A of a contact region between the indenter and the transparent protective layer are measured. The indentation hardness is calculated based on the following formula: H=P/A. The projected contact area A can be measured by the method disclosed in JP 2005-195357A.

The cross-linked structure is introduced, for example, by: applying a polymer solution such as a hydrogenated nitrile rubber solution onto a substrate; and, after drying the polymer solution, subjecting the substrate with the resulting dried product to irradiation with electron beams. An accumulated irradiation dose of electron beams necessary for introducing the cross-linked structure is preferably about 50 to 1000 kGy, more preferably, about 100 to 600 kGy, further more preferably, about 200 to 400 kGy. As long as the accumulated irradiation dose of electron beams is in the above range, a sufficient cross-linked structure can be introduced among polymer chains, and yellowing of the transparent protective layer 30 and the transparent film backing 10 can be suppressed, so that it becomes easier to obtain an infrared-ray reflective film excellent in visible ray transmittance and durability. In the case where a radical polymerizable multifunctional monomer such as a multifunctional (meth)acrylic-based monomer is used as a cross-linking agent, a sufficient cross-linked structure can be introduced among polymer chains even by a relatively low accumulated irradiation dose of about 50 kGy.

In the process of introducing a cross-linking structure into the polymer, a cross-linking agent may be used. As the cross-linking agent, a radical polymerizable multifunctional monomer is suitably used, and, a multifunctional (meth) acrylic-based monomer is particularly preferably used. Examples of the multifunctional (meth)acrylic-based monomer include trimethylolpropane tri(meth)acrylate, tris(acryloxyethyl) isocyanurate, ditrimethylolpropane tetra(meth) acrylate, pentaerythritol tetra(meth) acrylate, dipentaerythritol penta(meth) acrylate, and dipentaerythritol hexa(meth) acrylate.

In the case where such a cross-linking agent is used, an amount of addition of the cross-linking agent is preferably about 1 to 35 weight parts, more preferably, 2 to 25 weight parts, with respect to 100 weight parts of the polymer. If the content of the cross-linking agent is excessively small, the durability is not sufficiently enhanced, in some cases. On the other hand, if the content of the cross-linking agent is excessively large, the far-infrared absorption capacity is increased, and the far-infrared absorption capacity of the transparent protective layer is undesirably increased, so that the heat insulating property of the infrared-ray reflective film deteriorates, in some cases.

A formation method for the transparent protective layer is not particularly limited. For example, the transparent protective layer may be formed by; dissolving a polymer such as hydrogenated nitrile rubber in a solvent, together with a cross-linking agent as necessary, to prepare a solution; applying the solution into the infrared reflective layer 20; and drying the solution. The solvent is not particularly limited as long as it is capable of dissolving the polymer therein. For example, a low boiling-point solvent such as methyl ethyl ketone (MEK) or methylene chloride is suitably used. In the case where such a low boiling-point solvent, e.g., methyl ethyl ketone (boiling point: 79.5° C.) or methylene chloride (boiling point: 40° C.), is used as the solvent, the step of drying the solvent applied onto the infrared reflective layer 20 can be performed at a relatively low temperature, so that it becomes possible to suppress heat damage to the infrared reflective layer 20 and the transparent film backing 10.

In addition to the polymer, the material for the transparent protective layer 30 may contain additives such as: a coupling agent including a silane coupling agent and a titanium coupling agent; a leveling agent; an ultraviolet absorber; an antioxidant; a stabilizer such as a lubricant for a heat stabilizer; a plasticizer; a coloration inhibitor; a flame retardant; and an antistatic agent. Although the content of these additives may be appropriately adjusted without impairing the object of the present invention, it is preferably adjusted to allow the content of the polymer in the transparent protective layer to become 80 weight % or more. For example, in the case where a hydrogenated nitrile rubber is used as the material for the transparent protective layer, an amount of the hydrogenated nitrile rubber contained in the transparent protective layer is preferably 90 weight % or more, more preferably, 95 weight % or more, further more preferably, 99 weight % or more.

In the case where a polymer having a relatively low far-infrared absorptance, such as hydrogenated nitrile rubber, is used as the material for the transparent protective layer, a thickness of the transparent protective layer is preferably 1 to 20 more preferably, 2 to 15 µm, further more preferably, 3 to 10 µm. As long as the thickness of the transparent protective layer is in the above range, the transparent protective layer itself can have sufficient physical strength to enhance the protective function with respect to the infrared reflective layer, and can also have a sufficiently small far-infrared absorption capacity.

[Laminate Structure of Infrared-Ray Reflective Film]

The infrared-ray reflective film 100 of the present invention is configured by disposing the infrared reflective layer 20 comprising the first metal oxide layer 21, the metal layer 25 and the second metal oxide layer 22, and the transparent protective layer 30, on one principal surface of the transparent film backing 10, as mentioned above. With a view to enhancement in interlayer adhesion, increase in strength of the infrared-ray reflective film, etc., two additional layers such as hard coat layers or easy-adhesion layers may be provided, respectively, between the transparent film backing 10 and the infrared reflective layer 20 and between the infrared reflective layer 20 and the transparent protective layer 30. A material and a formation method for the additional layer such as an easy-adhesion layer or a hard coat layer are not particularly limited. For example, a transparent material having a high visible ray transmittance is suitably used.

In the infrared-ray reflective film of the present invention, the infrared reflective layer 20 is formed in the three-layer structure of the first metal oxide layer 21-the metal layer 25-the second metal oxide layer 22, and there is no metal layer between the transparent film backing 10 and the infrared reflective layer 20 and between the infrared reflective layer 20 and the transparent protective layer 30. This structure makes it possible to enhance productivity and reduce production cost. Furthermore, in the present invention, the metal oxide layers and the metal layer are composed by a given combination in terms of material and others. Thus, despite the infrared reflective layer 20 having the three-layer structure, the infrared-ray reflective film can have a high visible ray transmittance (high transparency), a low shading coefficient (high heat shielding property), a low emissivity (heat insulating property), and high durability.

The adhesive layer for use in bonding the infrared-ray reflective film to a window glass or the like may be additionally provided on a surface of the transparent film backing 10 on a side opposite to the infrared reflective layer 20. As the adhesive layer, a type having a high visible ray transmittance and a small difference in refractive index with respect to the transparent film backing 10 is suitably used. For example, an acrylic-based pressure-sensitive adhesive is suitable as a material for the adhesive layer additionally provided on the transparent film backing, because it exhibits excellent optical transparency, moderate wettability, aggregability and adhesiveness, and excellent durability such as weather resistance and heat resistance.

Preferably, the adhesive layer is a type having a high visible ray transmittance, and a low ultraviolet transmittance. By reducing the ultraviolet transmittance of the adhesive layer, it is possible to suppress degradation of the infrared reflective layer due to ultraviolet rays of solar light or the like. From a viewpoint of reducing the ultraviolet transmittance of the adhesive layer, the adhesive layer preferably contains an ultraviolet absorber. Alternatively, for example, the transparent film backing may contain an ultraviolet absorber. In this case, it is also possible to suppress degradation of the infrared reflective layer due to ultraviolet rays from an outdoor space.

Preferably, with a view to preventing contamination of an exposed surface of the adhesive layer, a separator is temporarily attached to the exposed surface to cover it until the infrared-ray reflective film is actually used. This makes it possible to prevent contamination of the exposed surface of the adhesive layer due to contact with outside environment.

[Properties of Infrared-Ray Reflective Film]

The visible ray transmittance of the infrared-ray reflective film of the present invention is preferably 65% or more, more preferably, 68% or more, further more preferably 70% or more. The shading coefficient of the infrared-ray reflective film is preferably less than 0.60, more preferably, 0.59 or less, further more preferably, 0.58 or less, particularly preferably, 0.57 or less. A corrected emissivity of the infrared-ray reflective film as measured from the side of the transparent protective layer 30 is preferably 0.20 or less, more preferably, 0.18 or less, further more preferably, 0.16 or less. In this specification, the corrected emissivity is measured according to JIS R3107:1998 (Evaluation on thermal resistance of flat glasses and thermal transmittance of glazing). A variation in corrected emissivity as measured after the infrared-ray reflective film is immersed in an aqueous solution containing 5 weight % of sodium chloride at 50° C., for 5 days, is preferably 0.05 or less, more preferably, 0.03, further more preferably, 0.02 or less. These properties are achieved by appropriately selecting respective materials and others of each layer constituting the infrared-ray reflective film, as described above.

[Use Applications]

The infrared-ray reflective film of the present invention can be suitably used for enhancing cooling and/or heating effects and preventing rapid temperature changes, in a state of being bonded to a window of a building, a vehicle or the like, a transparent casing for containing plants or the like, a freezer or refrigerator showcase, etc.

EXAMPLES

Although the present invention will be described in detail based on various examples, it is to be understood that the present invention is not limited to the following examples.

[Measurement Method Used in Inventive and Comparative Examples]

<Thickness of Each Layer>

A sample was machined by a focused ion beam (FIB) process using a focused ion beam machining and observation apparatus (product name "FB-2100", produced by Hitachi, Ltd.), and a cross-section of the resulting sample was observed by a field-emission type transmission electron microscope (product name "HF-2000", produced by Hitachi, Ltd.) to thereby determine respective thicknesses of the layers making up the infrared reflective layer. Respective thicknesses of the hard coat layer formed on the backing, and the transparent protective layer, were calculationally determined from an interference pattern caused by reflection of visible rays when light is entered from the side of the measurement target, by using an instantaneous multi-photometric system (product name "MCPD 3000", produced by Otsuka Electronics Co., Ltd.).

<Visible Ray Transmittance>

The visible ray transmittance was determined according to JIS A5759-2008 (Adhesive films for glazings), using a spectrophotometer (product name "U-4100" produced by Hitachi High-Technologies Corporation).

<Shading Coefficient>

A solar transmittance to and a soar reflectance ρe were measured using a spectrophotometer (product name "U-4100" produced by Hitachi High-Technologies Corporation) to calculate the shading coefficient according to the method a) in JIS A5759:2008 (Adhesive films for glazings).

<Corrected Emissivity>

The corrected emissivity was determined by measuring an infrared specular reflectance at a wavelength of 5 to 25 μm as a result of emitting infrared rays from the side of the protective layer, using a Fourier transform infrared (FT-IR) spectrometer equipped with angle variable reflection accessories (produced by Varian Medical Systems, Inc.), according to JIS R 3107:1998 (Evaluation on thermal resistance of flat glasses and thermal transmittance of glazing).

<Abrasion Resistance Test>

A laminate prepared by bonding a surface of the infrared-ray reflective film on the side of the transparent film backing to an aluminum plate through a 25 μm-thick pressure-sensitive adhesive layer was used as a sample. The transparent film backing-side surface of the infrared-ray reflective film on the aluminum plate was rubbed by testing cotton cloth (Canequim No. 3) while being subjected to 500 g of load applied therefrom, over 1000 strokes, using a Gakushin-type abrasion tester. The presence or absence of scratch or spalling in the protective layer of the sample after completion of the test was visually checked, and evaluation was performed in accordance with the following evaluation criteria.

Good: No scratch was observed in the surface, or no spalling occurred although fine scratches were observed.

NG: A large number of scratches and spalling were observed in the surface.

<Salt Water Resistance Test>

A laminate prepared by bonding the transparent film backing-side surface of the infrared-ray reflective film to a glass plate having a size of 3 cm×3 cm through a 25 μm-thick pressure-sensitive adhesive layer was used as a sample. This sample was immersed in an aqueous solution containing 5 weight % of sodium chloride, and a container containing the sample and the aqueous sodium chloride solution was put into a dryer at 50° C. Then, after 5 days, a variation in emissivity and a change in external appearance were checked, and evaluation was performed in accordance with the following evaluation criteria.

Good: Even after immersion for 5 days, no change in external appearance was observed, and the variation in emissivity was 0.05 or less although.

NG: After immersion for 5 days, a change in external appearance was observed, and the variation in emissivity was greater than 0.05.

Inventive Example 1

(Formation of Infrared Reflective Layer)

A 50 μm-thick polyethylene terephthalate film (trade name "Lumirror U48", produced by Toray Industries Inc., visible ray transmittance:93%) was used as the transparent film backing. Then, an infrared reflective layer was formed one surface of the backing by using a winding type sputtering apparatus. More specifically, a 30 nm-thick first metal oxide layer made of an indium-zinc composite oxide (IZO), a 15 nm-thick metal layer made of an Ag—Pd alloy, and a 30 nm-thick second metal oxide layer made of IZO were sequentially formed by a DC magnetron sputtering process. For forming each of the metal oxide layers, sputtering was performed under the following conditions: power density: 4 W/cm$^2$; introduction amounts of Ar gas and O$_2$ gas: 300 sccm (standard cubic centimeters per minute) and 3 sccm; and process pressure: 0.4 Pa, using an oxide target prepared by sintering a mixture of indium oxide and zinc oxide at a weight ratio of 90:10. For forming the metal layer, a metal target containing silver and palladium at a weight ratio of 99.5:0.5 was used.

(Formation of Protective Layer)

A protective layer made of a hydrogenated nitrile rubber (HNBR) was formed with a thickness of 4 μm, on the infrared reflective layer. More specifically, 10 weight parts of hydrogenated nitrile rubber (k:l:m=20.8:74.5:4.7) obtained by hydrogenating a copolymer of acrylonitrile and 1,3-butadiene was dissolved in 90 weight parts of methyl ethyl ketone, and the resulting solution was used as a coating solution. This coating solution was applied onto the infrared reflective layer using an applicator. The resulting coating was dried at 120° C. for 4 minutes and then subjected to cross-linking in a nitrogen atmosphere under irradiation with electron beams at an accelerating voltage of 125 kV and in an accumulated irradiation dose of 100 kGy.

(Measurement of Indentation Hardness)

The transparent film backing-side surface of the infrared-ray reflective film was bonded to a glass slide having a size of 1.5 cm×1.5 cm through an adhesive layer to prepare an indentation test sample. The test sample was fixed onto a stage of an observation type micro material evaluation system (product name "Micro Indent Scope MIS-2000" produced by Sanko Co., Ltd.), in such a manner that the transparent protective layer of the test sample is located on the side of an obverse surface of the test sample. A Berkovich-type diamond indenter is pressed into a surface of the transparent protective layer at an indentation speed of 0.1 μm/sec by an indentation depth of 3 μm, and, in this state, an indentation load, and a projected contact area of the indenter were measured. An indentation hardness H of the surface of the transparent protective layer calculated by the formula (H=P/A) based on the indentation load P and the projected contact area A determined by the above measurement was 3.5 MPa. Further, an indentation hardness H of the transparent protective layer before the irradiation with electron beams was also measured by the same test method. As a result, it was 1.2 MPa.

Inventive Example 2

Except that a 30 nm-thick metal oxide layer made of a zinc-tin composite oxide (ZTO) instead of IZO was formed as each of the first and second metal oxide layers, an infrared-ray reflective film was produced in the same manner as that in Inventive Example 1. For forming the ZTO metal oxide layer, sputtering was performed under the following conditions: power density: 4 W/cm$^2$; introduction amounts of Ar gas and O$_2$ gas: 300 sccm and 3 sccm; and process pressure: 0.4 Pa, using a metal-containing oxide target prepared by sintering a mixture of zinc oxide, tin oxide and a metal zinc power at a weight ratio of 10:82.5:7.5.

Inventive Example 3

(Formation of Hard Coat Layer onto Backing)

An acrylic-based ultraviolet-curable hard coat layer (trade name "NH2000G", produced by Nippon Soda Co., Ltd.) was formed with a thickness of 2 μm, on one surface of a 50 μm-thick polyethylene terephthalate film (trade name "Lumirror U48", produced by Toray Industries Inc., visible ray transmittance: 93%). More specifically, a hard coat solution was applied to the film by a gravure coater, and, the resulting coating was dried at 80° C. and then subjected to curing by irradiation with ultraviolet rays in an integrated light amount of 300 mj/cm$^2$, using an ultra-high pressure mercury lamp.

(Formation of Infrared Reflective Layer)

An infrared reflective layer was formed on the hard coat layer of the polyethylene terephthalate film backing by using a winding type sputtering apparatus. More specifically, a 30 nm-thick first metal oxide layer made of a zinc-tin composite oxide (ZTO), a 15 nm-thick metal layer made of an Ag—Pd alloy, and a 30 nm-thick second metal oxide layer made of ZTO were sequentially formed by a DC magnetron sputtering process. The formation of each of the ZTO metal oxide layers was performed under the same conditions as those in Inventive Example 2. For forming the metal layer, a metal target containing silver and palladium at a weight ratio of 97:3 was used.

(Formation of Protective Layer)

A protective layer made of a fluorine-based ultraviolet-curable resin was formed withy a 30 nm thickness, on the infrared reflective layer. More specifically, a solution prepared by adding a phosphoric ester compound (product name "KAYAMER PM-21", produced by Nippon Kayaku Co., Ltd.) to a fluorine-based hard coat resin solution ("JUA204", produced by JSR Corporation), in an amount of 5 weight parts with respect to 100 weight parts of a solid content of the fluorine-based hard coat resin solution was applied using an applicator, and the resulting coating was dried at 60° C. for 1 minute and then subjected to curing by irradiation with ultraviolet rays in an integrated light amount of 400 mj/cm$^2$, using an ultra-high pressure mercury lamp, in a nitrogen atmosphere.

Comparative Example 1

Except that, for forming the metal layer, a metal target containing silver and palladium at a weight ratio of 95:5 was used, an infrared-ray reflective film was produced in the same manner as that in Inventive Example 1.

Comparative Example 2

Except that, for forming the metal layer, a metal target made of silver was used, an infrared-ray reflective film was produced in the same manner as that in Inventive Example 1.

Comparative Example 3

Except that a 4 μm-thick acrylic-based hard coat layer was formed as the transparent protective layer, an infrared-ray reflective film was produced in the same manner as that in Inventive Example 1. The acrylic-based hard coat layer was formed by applying an acrylic-based hard coat solution (trade name "PC1097" produced by DIC Corporation) onto the infrared reflective layer, using a gravure coater; drying the resulting coating at 80° C. for 2 minutes; and subjecting the dried coating to irradiation with ultraviolet rays in an integrated light amount of 400 mj/cm$^2$, using an ultra-high pressure mercury lamp.

Comparative Example 4

Except that, for forming the metal layer, a metal target containing silver and copper at a weight ratio of 90:10 was used, an infrared-ray reflective film was produced in the same manner as that in Inventive Example 1.

Comparative Example 5

Except that no transparent protective layer was formed on the infrared reflective layer, an infrared-ray reflective film was produced in the same manner as that in Inventive Example 1.

Comparative Example 6

Except that a zinc-oxide target was used for forming each of the first and second metal oxide layers, an infrared-ray reflective film was produced in the same manner as that in Inventive Example 3.

Comparative Example 7

Except that a metal-containing oxide target prepared by sintering a mixture of indium oxide and tin oxide at a weight ratio of 90:10 was used for forming each of the first and second metal oxide layers, and the thickness of each of the first and second metal oxide layers was changed to 40 nm, an infrared-ray reflective film was produced in the same manner as that in Inventive Example 3.

Comparative Example 8

During formation of the infrared reflective layer, two Ni—Cr alloy layers each having a thickness of 3 nm were formed, respectively, between the first metal oxide layer and the metal layer and between the metal layer and the second metal oxide layer, by a sputtering process using a metal target containing nickel and chromium at a weight ratio of 80:20, so that the infrared reflective layer was formed in a 5-layer structure composed of ITO/Ni—Cr/Ag—Pd/Ni—Cr/ITO. Except for the above, an infrared-ray reflective film was produced in the same manner as that in Comparative Example 7.

Comparative Example 9

Except that the thickness of the transparent protective layer was changed to 20 μm, an infrared-ray reflective film was produced in the same manner as that in Inventive Example 2.

Respective evaluation results of the infrared-ray reflective films in the above Inventive and Comparative Examples are presented in Table 1. In Table 1, each composition ratio of the metal layer and the metal oxide layers is weight ratio.

TABLE 1

| | Metal Layer | Metal Oxide Layer | Protective Layer Material | Thickness | Visible Ray Transmittance (%) | Shading Coefficient | Corrected Emissivity | Abrasion Resistance | Salt Water Resistance |
|---|---|---|---|---|---|---|---|---|---|
| Inventive Example 1 | Ag:Pd = 99.5:0.5 | In$_2$O$_3$:ZnO = 90:10 | HNBR | 4 μm | 71 | 0.56 | 0.15 | Good | Good |
| Inventive Example 2 | Ag:Pd = 99.5:0.5 | SnO$_2$:ZnO = 81:19 | HNBR | 4 μm | 71 | 0.56 | 0.15 | Good | Good |
| Inventive Example 3 | Ag:Pd = 97:3 | SnO$_3$:ZnO = 81:19 | Fluoropolymer | 60 μm | 69 | 0.59 | 0.08 | Good | Good |
| Comparative Example 1 | Ag:Pd = 95:5 | In$_2$O$_3$:ZnO = 90:10 | HNBR | 4 μm | 66 | 0.58 | 0.07 | Good | Good |
| Comparative Example 2 | Ag | In$_2$O$_3$:ZnO = 90:10 | HNBR | 4 μm | 72 | 0.56 | 0.17 | Good | NG |
| Comparative Example 3 | Ag:Pd = 99.5:0.5 | In$_2$O$_3$:ZnO = 90:10 | Acrylic polymer | 4 μm | 71 | 0.56 | 0.50 | Good | Good |
| Comparative Example 4 | Ag:Cu = 90:10 | In$_2$O$_3$:ZnO = 90:10 | HNBR | 4 μm | 70 | 0.62 | 0.16 | Good | Good |
| Comparative Example 5 | Ag:Pd = 99.5:0.5 | In$_2$O$_3$:ZnO = 90:10 | — | | 79 | 0.57 | 0.06 | NG | NG |
| Comparative Example 6 | Ag:Pd = 97:3 | ZnO | Fluoropolymer | 60 μm | 62 | 0.52 | 0.08 | Good | NG |
| Comparative Example 7 | Ag:Pd = 97:3 | In$_2$O$_3$:ZnO = 90:10 | Fluoropolymer | 60 μm | 69 | 0.56 | 0.15 | Good | NG |
| Comparative Example 8 | Ag:Pd = 97:3 Ni:Cr = 80:20 | In$_2$O$_3$:ZnO = 90:10 | Fluoropolymer | 60 μm | 54 | 0.57 | 0.08 | Good | Good |
| Comparative Example 9 | Ag:Pd = 99.5:0.5 | SnO$_3$:ZnO = 81:19 | HNBR | 4 μm | 68 | 0.56 | 0.24 | Good | Good |

In Comparative Example 1 where the Ag content in the metal layer is excessively small, a decrease in the visible ray transmittance was observed. Further, in Comparative Example 2 where the metal layer is made of pure silver, a deterioration in the durability was observed.

In Comparative Example 3 where an acrylic-based hard coat layer is used as the transparent protective layer, a rise in the emissivity was observed. This is probably because the acrylic-based resin has a large number of C=O bonds in the molecule, so that it has a large far-infrared absorption capacity. Further, in Comparative Example 9 where a hydrogenated nitrile rubber is used as the material for the transparent protective layer, and the thickness of the transparent protective layer is set to a relatively large value of 20 μm, due to an increase in the far-infrared absorption capacity, a rise in the emissivity was observed. In Comparative Example 5 where no transparent protective layer is formed, the durability was poor although the emissivity is small because no absorption of far-infrared rays by the protective layer occurs.

In Comparative Example 4 where a silver-copper alloy layer is used as the metal layer, an increase in the shading coefficient (deterioration in the heat shielding property) was observed although the visible ray transmittance is sufficiently high. This is probably because, due to the excessively low Ag content, it becomes impossible to impart adequate wavelength selectivity in reflectance to the infrared reflective layer, resulting in high transmittance for both visible rays and near-infrared rays. Further, in Comparative Example 8 where the metal layer is formed in a 3-layer structure composed of two Ni—Cr alloy layers and an Ag—Pd alloy layer sandwiched therebetween, a decrease in the visible ray transmittance was observed.

In Comparative Example 7 where ITO is used as each of the metal oxide layers, the visible ray transmittance is low, and the durability of the infrared absorption layer was insufficient. Further, in Comparative Example 7 where zinc oxide is used as each of the metal oxide layers, a decrease in the visible ray transmittance and a deterioration in the durability were observed. The above results show that, in order to form an infrared reflective layer having a high visible ray transmittance and excellent durability, it is desirable to employ a zinc oxide-containing composite oxide as the material for each of the metal oxide layers.

On the other hand, each of the infrared-ray reflective films in Inventive Examples 1 to 4 exhibited a high visible ray transmittance, a high shading coefficient, a low emissivity, and excellent durability. Among them, Inventive Examples 1 and 2 where a hydrogenated nitrile rubber is used in the transparent protective layer exhibited a high visible ray transmittance of greater than 70%.

LIST OF REFERENCE SIGNS

100: infrared-ray reflective film
10: transparent film backing
20: infrared reflective layer
21, 22: infrared reflective layer
25: metal layer
30: protective layer 30
60: adhesive layer 60

The invention claimed is:
1. An infrared-ray reflective film comprising:
a transparent film backing;
an infrared reflective layer over the transparent film backing; and
a transparent protective layer over the infrared reflective layer, the transparent protective layer comprising polyolefin, alicyclic polymer, or rubber-based polymer in which a part or an entirety of double bonds contained therein is hydrogenated; wherein;
the infrared-ray reflective film has a visible ray transmittance of 65% or more, a shading coefficient of less than 0.60, and a corrected emissivity as measured from the side of the transparent protective layer of 0.20 or less;
the infrared reflective layer comprises a first metal oxide layer, a single metal layer comprising at least 96% silver, and a second metal oxide layer, which are arranged in this order from the side of the transparent film backing, wherein each of the first metal oxide layer and the second metal oxide layer is in direct contact with the metal layer;
the transparent protective layer is 1 μm to 15 μm thick, the metal layer has a thickness of 5 nm to 50 nm; and
there is no metal layer between the transparent film backing and the infrared reflective layer and between the infrared reflective layer and the transparent protective layer.
2. The infrared-ray reflective film as recited in claim 1, wherein the metal layer contains palladium in an amount of 0.1 weight % or more.
3. The infrared-ray reflective film as recited in claim 1, wherein each of the first metal oxide layer and the second metal oxide layer is a zinc oxide-containing, amorphous, composite metal oxide layer.
4. The infrared-ray reflective film as recited in claim 1, wherein each of the first metal oxide layer and the second metal oxide layer is a composite metal oxide layer selected from the group consisting of indium-zinc composite oxide, zinc-tin composite oxide, and indium-tin-zinc composite oxide.
5. The infrared-ray reflective film as recited in claim 1, wherein a change in emissivity of the infrared-ray reflective film after being immersed in a 5 weight % sodium chloride aqueous solution at 50° C., for 5 days, is 0.05 or less.
6. The infrared-ray reflective film as recited in claim 1, wherein the transparent protective layer is a wet-coated organic material layer.
7. The infrared-ray reflective film as recited in claim 1, wherein at least one of the first metal oxide layer or the second metal oxide layer has a thickness of 3 nm to 80 nm.
8. The infrared-ray reflective film as recited in claim 1, wherein a total thickness of the first metal oxide layer, the metal layer and the second metal oxide layer is from 11 nm to 95 nm.
9. The infrared-ray reflective film as recited in claim 1, wherein a total thickness of the first metal oxide film, the metal layer, the second metal oxide film and the transparent protective layer is from about 100 nm to about 400 nm.
10. The infrared-ray reflective film as recited in claim 1, wherein at least one of the first metal oxide layer or the second metal oxide layer has a refractive index with respect to visible light of at least 1.5.
11. The infrared-ray reflective film as recited in claim 1, wherein the metal layer comprises a non-silver metal in an amount of 0.1 weight % or more.
12. An infrared-ray reflective film, comprising:
a transparent substrate;
an infrared reflective layer over the transparent substrate, the infrared reflective layer comprising:
a first metal oxide layer;
a single alloy layer over the first metal oxide layer, the alloy layer comprising at least 96% silver; and a second metal oxide layer over the alloy layer; and
a transparent protective layer over the infrared reflective layer, the transparent protective layer comprising polyolefin, alicyclic polymer, or rubber-based polymer in which a part or an entirety of double bonds contained therein is hydrogenated,
wherein
the transparent protective layer is 1 μm to 15 μm thick, and the alloy layer has a thickness of 5 nm to 25 nm,
the first metal oxide layer is between the transparent substrate and the alloy or the second metal oxide layer is between the transparent substrate and the alloy layer,
the infrared-ray reflective film has a visible ray transmittance of at least 65%, and
the infrared-ray reflective film has a shading coefficient of less than 0.60.

13. The infrared-ray reflective film as recited in claim 12, wherein at least one of the first metal oxide layer or the second metal oxide layer has a thickness of 3 nm to 50 nm.

14. The infrared-ray reflective film as recited in claim 12, wherein a total thickness of the infrared reflective layer is from 11 nm to 90 nm.

15. The infrared-ray reflective film as recited in claim 14, wherein at least one of the first metal oxide layer or the second metal oxide layer is in direct contact with the alloy layer.

* * * * *